3,090,816
ISOMERIZATION OF ALKYLENE OXIDE
William I. Denton, Cheshire, Conn., assignor to Olin Mathieson Chemical Corporation, New Haven, Conn., a corporation of Virginia
No Drawing. Filed June 8, 1959, Ser. No. 818,557
9 Claims. (Cl. 260—632)

This invention relates to the catalytic conversion of gaseous alkylene oxide containing 3 to 5 carbon atoms to an isomeric alcohol, for example, propylene oxide to allyl alcohol, and particularly to an improved process therefor using a highly efficient catalyst rendered suitable for use by a novel treatment with liquid solvent.

In this type of process, the prior art catalysts have been characterized by insufficient extents of conversion and inadequate production capacity to make them commercially attractive. Thus, the trilithium phosphate catalyst of U.S. 2,426,264 was disclosed as resulting in the conversion at each pass of only about 17 to 21% of the propylene oxide feed to allyl alcohol, at production rates of 60 to 179 grams of allyl alcohol per liter of catalyst per hour.

The main object of this invention has been to provide a catalytic process for the conversion of propylene oxide to allyl alcohol using an efficient catalyst which is capable of activation to produce a high extent of conversion at each cycle and characterized by large productive capacities and high ultimate yields of allyl alcohol from the propylene oxide feed.

A further object has been to provide a novel method of activating a relatively inactive catalyst to high efficiency in the above type of isomerization process.

The foregoing and other objectives have been accomplished in that extents of conversion of oxide to alcohol in each cycle of 60% to about 85% with ultimate yields of 83% to 95%, and production rates of 250 to about 530 grams of alcohol per liter of activated catalyst per hour have been attained. Furthermore, such efficiency has been restored by the activation process of this invention to catalysts whose activity had been decreased by use.

Highly effective catalysts for this type of conversion comprise leached basic lithium phosphate as described in detail in copending application Ser. No. 803,792, filed April 2, 1959, now U.S. Patent 2,986,585 issued May 30, 1961. The preparation involves the precipitation of a basic lithium phosphate, preferably by double decomposition in the presence of at least 0.2 mole, preferably 1 to 2 moles of alkali metal hydroxide or other basic compound per mole of lithium orthophosphate. The precipitate is then leached three to five times with a large volume of water, preferably at a temperature of 50° to 95° C. The resulting highly effective leached basic lithium phosphate catalyst has essentially a composition corresponding to lithium orthophosphate, but contains residual excess alkali metal hydroxide or other basic compound equivalent to 0.05 to 1% by weight of the alkali metal.

In the evaluation of catalysts prepared by various methods for use in the isomerization of an alkylene oxide to the corresponding unsaturated alcohol, the activity of the catalyst is measured by the extent of conversion of oxide to alcohol per pass through the reactor. Thus, a fairly active catalyst results in over 40% conversion and a catalyst of excellent activity can result in the conversion of up to about 85% of the oxide to alcohol for each pass through the catalyst bed.

The selectivity of the catalyst is likewise of great importance in view of the possibility of other conversions, it being well known for example that alkylene oxides can be isomerized to aldehydes as well as other carbonyl compounds. The occurrence of such side reactions results in the consumption of the starting alkylene oxide to products other than the desired alcohol. With the use of a highly selective catalyst, such side reactions are suppressed, so that unconverted alkylene oxide can be recovered and again passed through the reactor, resulting in ultimate yields of alcohol as high as over 90% to 95% of the starting oxide. The ultimate yield, which is thus a measure of the selectivity of the catalyst can be determined by dividing the weight of alcohol obtained by the weight of oxide consumed (weight of recovered oxide subtracted from the weight passed through the reactor) or, generally more conveniently, by dividing the weight of the alcohol product by the total weight of all products other than recovered oxide. For commercial success, the catalyst should be sufficiently selective as to result in ultimate yields of the desired alcohol product amounting to over 80 to 95%, preferably over 85%.

The improved process using the leached basic lithium phosphate catalyst provides excellent results at reaction temperatures within the range of about 250° to 350° C., preferably at about 275° C. to 300° C.

The rate of feed of liquid alkylene oxide may be varied from space velocities of about 0.3 to 2.0, preferably 0.5 to 1.0. Space velocity is defined herein as the volume of liquid feed per hour divided by the volume occupied by the catalyst. Residence time in the reaction zone within the above range amounts to about 2 to 50 seconds.

The catalyst will undergo a gradual decrease in activity with extended use. However, the selectivity of the present catalyst is not significantly impaired even after extended use, so that the ultimate yield of the desired alcohol remains high. Thus, while frequent regeneration is not essential, it is generally economical to restore the activity by suitable treatment when the conversion per pass had decreased to a value of 30 to 45%. Such a point may be reached after use of the catalyst for 24 to 48 hours or, expressed differently, after the catalyst has converted about 10 to 15 times its weight of oxide to alcohol.

In accordance with this invention, catalysts of initially inadequate effectiveness or which have been somewhat inactivated by use may readily be made highly effective by treatment, generally at an elevated temperature within the range of about 50° to 250° C., with a liquid oxygen-containing polar organic solvent such as acetone, propylene oxide, methyl alcohol, ethyl alcohol, butyl acetate and dioxane. Catalysts may be recycled in this way forty or fifty times and still display the high original activity and selectivity, and in fact, may even be somewhat improved after such regeneration.

It is noteworthy that attempts to activate or regenerate by heating the catalyst in air, or air mixed with oxygen or steam, or oxygen mixed with steam, as disclosed in U.S. 2,426,264, have been unsuccessful when applied to catalysts of initially high effectiveness. For example, a leached basic lithium phosphate catalyst which displayed an initial activity of 61 (61% of the propylene oxide passed once through the catalyst bed was converted to allyl alcohol) and a selectivity of 85 (85% of the propylene oxide passed cyclically through the catalyst bed yielded allyl alcohol in the product) was used in the process until the activity and selectivity had decreased, respectively, to 43 and 80. The catalyst was then heated for 16 hours in a current of air with the bed temperature regulated at 350° C., resulting in peak temperatures within the bed of 375° C. The so-treated catalyst was then found to be characterized by decreased activity and selectivity of 29 and 62, respectively.

It has now been shown that treatment of the catalyst with certain polar organic solvents in the liquid state results in the restoration of the original effectiveness of the catalyst prior to any fouling thereof through use in the isomerization process, or in the imparting of even greater effectiveness.

The suitable polar organic solvents which have been found effective are organic oxygen-containing saturated aliphatic compounds such as oxides, ketones, aldehydes, ethers, alcohols, acids and esters. The preferred liquids are oxides such as propylene oxide, butylene oxide, and amylene oxide, and ketones such as acetone, methyl ethyl ketone, methyl propyl ketone and cyclohexanone. Suitable ethers are diethyl ether, dipropyl ether, and dioxane. Examples of useful alcohols are methyl, ethyl, n-propyl, isopropyl, butyl, hexyl and cyclohexyl alcohols and also polyhydric alcohols such as ethylene glycol and glycerine. Lower fatty acids such as acetic, propionic and butyric acid are effective, as are also the lower alcohol esters thereof such as methyl acetate, ethyl propionate, and butyl acetate. Suitable aldehydes are propionaldehyde, butyraldehyde and benzaldehyde.

It should be noted that, in general, other types of organic solvents have been found to be ineffective for the purpose when used in similar fashion. Thus, hydrocarbons have insufficient solvent power for deposits on the used catalyst to effect activation to the desired extent. Solvents containing halogen or sulfur have a deactivating or poisoning action, while compounds such as those characterized by ethylenic unsaturation can be used only at temperatures below which they are stable in the presence of the catalyst.

Although some improvement is effected by treatment of the catalyst at room temperature, best results are obtained at elevated temperatures up to about 300° C., generally within 50° to 250° C., the preferred range being 125°–200° C. At temperatures above the normal boiling point of the solvent, which may extend up to about 25° C. below the critical temperature, pressures sufficiently greater than atmospheric must be used so as to maintain the solvent in the liquid phase.

In any case, the temperature should not be so high as to cause instability; thus, saturated aldehydes such as propionaldehyde should be used at temperatures below about 150° C., while unsaturated aldehydes such as acrolein should not be used at temperatures above about 50° C. and unsaturated alcohols such as allyl alcohol are useful at temperatures up to about 125° C.

The best operating temperature for a particular solvent will depend somewhat on the proportion used and on the extent of inactivation of the catalyst. Generally, the higher the temperature of treatment within the above preferred range, the smaller is the proportion of solvent required for adequate regeneration and the longer the useful life of the regenerated catalyst in the isomerization process.

While the listed types of solvent may be used in the anhydrous or nearly anhydrous state, the presence of water therein up to 10% or 20% by weight is generally permissible and may at times have a desirable activating effect at concentrations up to about 30% by weight.

The proportion of solvent to catalyst under treatment may be varied for effective results between rather wide limits depending largely on the extent of fouling. Generally 1 to 15 volumes of solvent are used per volume of catalyst, preferably 2 to 10 volumes under usual operating conditions. However, higher volume ratios may be desirable at times, as when a catalyst has been extensively fouled by use for 100 hours or more, when the use of 30 volumes of solvent per volume of catalyst may be necessary.

The treatment is generally applied by pumping fresh liquid through the catalyst, generally for 2 to 10 hours. The volume ratio may be reduced to less than 5 volumes of solvent per volume of catalyst when the latter has been used in the process for periods not exceeding 48 hours or by recirculating the solvent. Lower volume ratios are also used when the regeneration is carried out by a customary extraction procedure wherein the solvent is distilled from the extract, condensed as pure solvent, and the latter is caused to flow through the catalyst.

The regeneration is most practically effected without removing the catalyst bed from the isomerization apparatus, the activating solvent being caused to pass through the catalyst bed while the latter is maintained in position. Thus, any need for dismantling the isomerization apparatus and the removal of catalyst is avoided. Also, the required activation temperature is readily controlled by the regulatable heating units available in the chamber housing the catalytic bed.

Preferably, the activating liquid is one containing not more than six carbon atoms. Such liquids have the required activating effect and are readily removed from the catalyst by volatilization after the treatment has been completed by lowering the pressure and, if necessary, by passing a stream of gas, for example, air, nitrogen or carbon dioxide through the catalyst. Less volatile oxygen-containing liquids, containing more than six carbon atoms, may be used for the activating treatment, although generally requiring an additional step for removal. In such cases, following the treatment, the liquid is removed from the catalyst by washing thoroughly with water or other volatile solvent, and the latter is subsequently removed by volatilization. Examples of effective solvents of low volatility are methyl hexyl ketone, ethyl heptyl ketone, octyl alcohol, decyl alcohol, ethylene glycol monomethyl ether, diethylene glycol dimethyl ether, diethylene glycol diacetate, dibutyl phthalate, phenol and tetrahydrofurfuryl alcohol.

In the following specific examples, catalysts were evaluated for effectiveness by passing propylene oxide through a bed thereof at a temperature of 275° C., at atmospheric pressure and at a space velocity of 0.5, the product being analyzed for its content of allyl alcohol, recovered propylene oxide, and other carbonyl-containing compounds. The activation treatment with solvent was applied to 120 gram lots of catalysts, generally after it had been used in the isomerization process under the above conditions for 24 to 48 hours, unless otherwise indicated, and thus, having reduced catalytic effectiveness.

| Example | Catalyst | Yield of Allyl Alcohol | |
|---|---|---|---|
| | | Per Pass | Ultimate |
| 1 | Freshly prepared leached basic lithium phosphate. | 58.1 | 82 |
| 2 | Ex. 1, after use 30 hours | 48.1 | 87 |
| 3 | Ex. 2, after treatment with 10 cc./min. of liquid acetone for 2 hours at 170° C. and 300 p.s.i.g. | 65.2 | 86 |
| 4 | Ex. 3, after use 50 hours | 37.1 | 82 |
| 5 | Ex. 4, after treatment with air for 60 hours at 290° C. and then for 3 hours at 315° C. | 34.7 | 59 |
| 6 | Ex. 1, duplicate | 57.9 | 80 |
| 7 | Ex. 6, after use 69 hours | 23.0 | 79 |
| 8 | Ex. 7, after treatment with 10 cc./min. of liquid propylene oxide for 5.5 hours at 125° C. and 300 p.s.i.g. | 61.0 | 88 |
| 9 | Ex. 8, after use 44 hours | 44.0 | 87 |
| 10 | Ex. 9, after treatment with 10 cc./min. of liquid dioxane for 2.0 hours at 170° C. and 300 p.s.i.g. | 57.4 | 86 |
| 11 | Ex. 10, after use 40 hours | 50.0 | 88 |
| 12 | Ex. 11, after treatment with 10 cc./min. of liquid ethyl acetate for 4.0 hours at 150° C. and 300 p.s.i.g. | 55.6 | 89 |
| 13 | Freshly prepared leached basic lithium phosphate. | 60.3 | 87 |
| 14 | Ex. 13, after use 48 hours | 44.8 | 89 |
| 15 | Ex. 14, after treatment with 6 cc./min. of liquid ethyl alcohol (5% by weight of water) for 4 hours at 150° C. and 300 p.s.i.g. | 54.6 | 85 |
| 16 | Ex. 15, after use 43 hours | 44.4 | 83 |
| 17 | Ex. 16, after treatment with 6 cc./min. of liquid acetone (30% by weight of water) for 3.33 hours at 125° C. and 300 p.s.i.g. | 59.1 | 89 |
| 18 | Ex. 17, after use 42 hours | 46.9 | 87 |
| 19 | Ex. 18, after treatment with 3.5 cc./min. of liquid butyl acetate for 3.5 hours at 150° C. and 300 p.s.i.g. | 64.1 | 86 |
| 20 | Ex. 19, after use 44 hours | 39.1 | 84 |
| 21 | Ex. 20, after treatment with 6 cc./min. of liquid acetone for 3 hours at 150° C. and 300 p.s.i.g. | 62.6 | 86 |

The following results were obtained by activation of 120 cc. of catalyst with 2 cc. of solvent per minute for 2 hours at different temperatures and at the indicated pressures, the activity and selectivity values being shown before and after the activation treatment.

SOLVENT—LIQUID ACETONE

| Example | Temperature, ° C. | Pressure p.s.i.g. | Activity | | Selectivity | |
|---|---|---|---|---|---|---|
| | | | Before | After | Before | After |
| 22 | 170 | 300 | 46 | 62 | 82 | 85 |
| 23 | 170 | 300 | 56 | 65 | 80 | 83 |
| 24 | 100 | 300 | 55 | 64 | 84 | 85 |
| 25 | 50 | 300 | 53 | 57 | 85 | 84 |
| 26 | 25 | 0 (atmospheric) | 26 | 57 | 64 | 82 |

SOLVENT—LIQUID PROPYLENE OXIDE

| Example | Temperature, ° C. | Pressure p.s.i.g. | Activity | | Selectivity | |
|---|---|---|---|---|---|---|
| | | | Before | After | Before | After |
| 27 | 125 | 300 | 23 | 61 | 79 | 88 |
| 28 | 75 | 300 | 42 | 52 | 87 | 88 |
| 29 | 25 | 50 | 30 | 59 | 77 | 82 |

It is at times advantageous to effect the activation of the catalyst with the use of a liquid mixture of organic oxygen-containing solvents. For example, a solution of propylene oxide or of propionaldehyde or of both in acetone or a solution of propionaldehyde in propylene oxide may be effectively utilized for the activation of catalyst.

The activation process of this invention is likewise advantageous for the treatment of catalysts for the isomerization of butylene oxide and amylene oxide, particularly the 1,2 oxides, to the corresponding isomeric alcohols.

Modifications in the above detailed procedures will be apparent to those skilled in the art and are included within the scope of the following claims.

What is claimed is:
1. In the isomerization of an alkylene oxide containing 3 to 5 carbon atoms to the corresponding alcohol,
   wherein said oxide is contacted in the gaseous state with a leached basic lithium phosphate catalyst at a temperature of about 250° C. to 350° C.
   said catalyst initially having an activity effecting more than 40% conversion in a single pass and gradually decreasing in effectiveness during use,
   and wherein the said isomerization is interrupted for catalyst activation,
   the process of restoring substantially the initial catalyst activity consisting essentially of contacting the catalyst after use in said isomerization with a liquid saturated aliphatic solvent composed of oxygen, hydrogen and up to sixteen carbon atoms, selected from the group consisting of ethers, oxides, ketones, aldehydes, acids, alcohols and esters.
   at a temperature of up to about 25° C. below the critical temperature of the said solvent and at a pressure sufficient to maintain said solvent in the liquid phase.
   and removing the solvent from the said catalyst.
2. The process of claim 1, wherein the catalyst is contacted with 1 to 15 volumes of said liquid solvent per volume of said catalyst.
3. The process of claim 1, wherein said liquid solvent is maintained at a temperature of about 125° C. to 200° C.
4. The process of claim 1, wherein said liquid is acetone.
5. The process of claim 1, wherein said liquid is propylene oxide.
6. The process of claim 1, wherein said liquid is dioxane.
7. The process of claim 1, wherein said liquid is ethanol.
8. The process of claim 1, wherein said liquid is ethyl acetate.
9. In the isomerization of propylene oxide to allyl alcohol,
   wherein said oxide is contacted in the gaseous state with a leached basic lithium phosphate catalyst at a temperature of about 250° C. to 350° C.
   said catalyst effecting more than 40% conversion in a single pass and gradually decreasing in effectiveness during use,
   and wherein the said isomerization is interrupted for catalyst activation,
   the process of restoring substantially the initial catalyst activity consisting essentially of contacting the catalyst after use in said isomerization with a liquid saturated aliphatic solvent composed of oxygen, hydrogen and up to six carbon atoms, selected from the group consisting of ethers, oxides, ketones, aldehydes, acids, alcohols and esters.
   at a temperature of about 25° C to 300° C. and at a pressure sufficient to maintain said solvent in the liquid phase,
   and removing the solvent from the said catalyst.

References Cited in the file of this patent
UNITED STATES PATENTS

| 2,426,264 | Fowler et al. | Aug. 26, 1947 |
| 2,784,238 | Jacobs | Mar. 5, 1957 |
| 2,881,220 | Griffin et al. | Apr. 7, 1959 |